(No Model.)

G. W. PERRINE.
HOE.

No. 312,218. Patented Feb. 10, 1885.

WITNESSES:
Harry Freas
A. C. Bonner

INVENTOR
Geo. W. Perrine
BY
Fred W. Bond
ATTORNEY

UNITED STATES PATENT OFFICE.

GEORGE W. PERRINE, OF CANTON, OHIO.

HOE.

SPECIFICATION forming part of Letters Patent No. 312,218, dated February 10, 1885.

Application filed September 18, 1884. (No model.)

*To all whom it may concern:*

Be it known that I, GEORGE W. PERRINE, a citizen of the United States, residing at Canton, in the county of Stark and State of Ohio, have invented certain new and useful Improvements in Hoes; and I do hereby declare that the following is a full, clear, and exact description of the same, reference being had to the annexed drawings, making a part of this specification, and to the letters and figures of reference marked thereon, in which—

Figure 1:
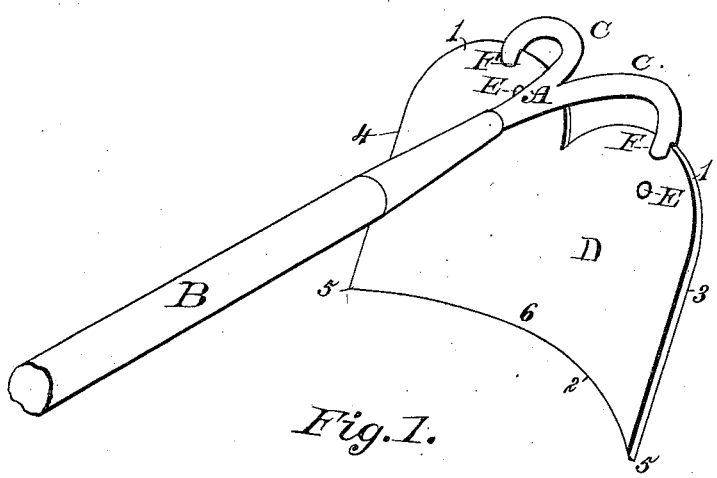
Figure 3:
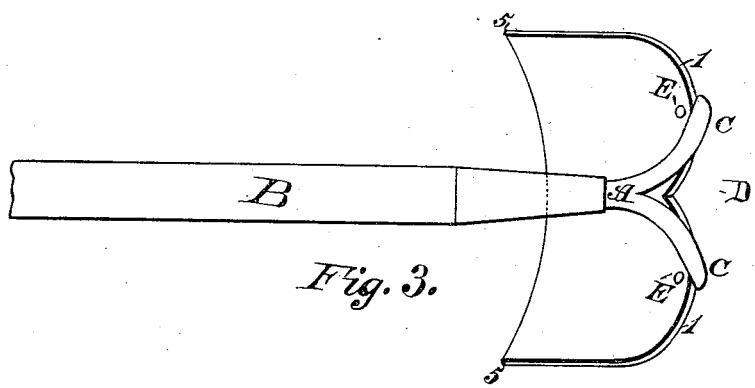
Figure 2:
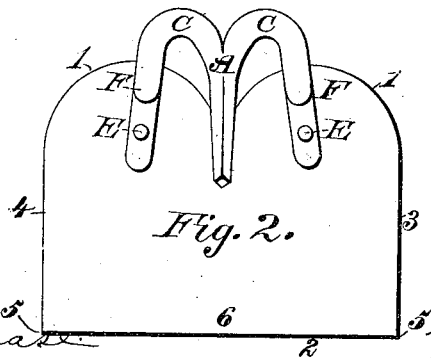

Figure 1 is a perspective view. Fig. 2 is a detached view of shank. Fig. 3 is a top view.

The present invention relates to that class of hoes designed to be used for general agricultural purposes. Its nature consists in the several parts and combination of parts hereinafter described, and pointed out in the claims and the accompanying drawings.

A represents the shank, which is attached to the handle B in the ordinary manner. The front or forward end of said shank, which is attached to the handle B, is provided with the arms C C, to which said arms is attached the blade D by means of rivets E. The arms C are provided upon their inner side with a lip or downward projection, F, which passes over the top of the blade D, as seen in Fig. 1, and when the blade D is properly attached to the shank A by the rivets E the lips or downward projections are closed firmly on the blade, thereby holding said blade in proper position.

In case the shank A is made of malleable iron, the rivets E are cast on the arms C, and become a part thereof; or, should the shank A be made of malleable iron or other material without the rivets being cast on the arms C, holes may be cast or drilled in said arms C, for the reception of rivets in the ordinary manner. The blade D of the hoe is composed of a flat metal plate formed as the segment of a circle or cylinder, (see Fig. 3)—that is to say, it is concavo-convex from the upper edge, 1, to the lower edge, 2, and the lower edge, 2, is straight in a horizontal plane from one vertical edge, 3, to the other vertical edge, 4, the lower end corners of the blade being angular, as at 5. By such construction the central portion, 6, of the blade so operates that when the hoe is drawn in the earth for carrying the dirt to the hill or other place of deposit the tendency of the hoe is to sink deeper into the earth, and, further, a shear cutting edge is formed. The segmental form of the blade from top to bottom causes the soil to accumulate in or on the blade as it is drawn in the soil, instead of permitting the soil to escape at the sides of the blade, as when the latter is simply a flat plate or is simply curved at the lower edge, leaving the main body of the blade perfectly straight.

In addition to the straight and central shear cutting edge, 6, the lower corners, 5, of the blade, being formed as right angles, permit the corners to readily cut or penetrate the soil for loosening the same preparatory to drawing the hoe and carrying the soil to the hill or place of deposit.

It will be observed that the top edge, 1, of the blade is curved from one vertical edge to the other in the same segment of a circle as the other portions of the blade, and the arms C, comprising the bifurcated shank, become radius-bars in laterally bracing the curved top edge of the blade, thereby rendering the structure strong and substantial.

In order to apply the bifurcated shank to the curved top edge of a segmental hoe of the character described, it is essential to so arrange the bifurcations that their outer extremities coincide with the arc of the circle described from the point as a center where the bifurcations join the shank.

A hoe possessing the characteristic features herein shown and described is an article of usefulness, and one that is very efficient in use.

Hoes have heretofore been known wherein the blade is curved transversely, and is convex at each end, the arms of a bifurcated shank being secured to the side edges of the blade; but my invention differs therefrom in material respects, in that in my construction the arms of the bifurcated shank are attached to the top edge of the segmental blade and extend vertically down the rear convex surface of the blade to brace the same; and, further, the lower edge forms, in conjunction with the straight sides 4, the rectangular corners 5. I do not, therefore, claim the combination of a curved blade and bifurcated shank; but,

Having now fully described my invention, what I claim as new, and desire to secure by Letters Patent, is—

As an article of manufacture, a hoe consisting of a blade concavo-convex from the top to the bottom edges, with the lower edge, 6, forming, in conjunction with the vertical sides, the rectangular corners, and a bifurcated shank, the bifurcations of which are secured to the transversely-curved top edge portion of the blade, substantially as shown and described.

In testimony that I claim the above I have hereunto subscribed my name in the presence of two witnesses.

GEO. W. PERRINE.

Witnesses:
 A. C. TONNER,
 FRED W. BOND.